(12) United States Patent
Burckart et al.

(10) Patent No.: US 8,935,410 B2
(45) Date of Patent: Jan. 13, 2015

(54) COBROWSING MACROS

(75) Inventors: Erik J. Burckart, Raleigh, NC (US);
Andrew J. Ivory, Wake Forest, NC (US); Todd E. Kaplinger, Raleigh, NC (US); Barry J. Pellas, Durham, NC (US); Matthew T. Pellas, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 13/588,325

(22) Filed: Aug. 17, 2012

(65) Prior Publication Data

US 2014/0052868 A1 Feb. 20, 2014

(51) Int. Cl.
*G06F 15/16* (2006.01)

(52) U.S. Cl.
USPC ........... 709/227; 709/203; 705/54; 705/59

(58) Field of Classification Search
CPC ............ H04L 65/403; H04L 65/4007; H04L 65/4015
USPC ............................... 709/227, 203; 705/54, 59
See application file for complete search history.

(56) References Cited

U.S. PATENT DOCUMENTS

| | | | |
|---|---|---|---|
| 6,449,640 B1 * | 9/2002 | Haverstock et al. | 709/219 |
| 6,708,172 B1 * | 3/2004 | Wong et al. | 1/1 |
| 7,614,014 B2 | 11/2009 | Burgin et al. | |
| 8,489,676 B1 * | 7/2013 | Chaplin et al. | 709/203 |
| 2003/0074204 A1 * | 4/2003 | Krothapalli et al. | 705/1 |
| 2006/0070075 A1 | 3/2006 | Rodionov | |
| 2008/0052377 A1 | 2/2008 | Light | |
| 2008/0263193 A1 * | 10/2008 | Chalemin et al. | 709/224 |
| 2011/0289155 A1 * | 11/2011 | Pirnazar | 709/206 |

OTHER PUBLICATIONS

"Let me Google that for you", http://lmgtfy.com/, downloaded on Jul. 30, 2012.

* cited by examiner

*Primary Examiner* — Duyen Doan
(74) *Attorney, Agent, or Firm* — Jordan IP Law, LLC

(57) ABSTRACT

Methods and systems of conducting co-browsing sessions may involve joining a co-browsing session with another peer device, receiving a plurality of web requests in a particular sequence from a macro, and transmitting the plurality of web requests in the particular sequence to a server associated with the co-browsing session. In one example, the particular sequence defines a navigation path to a requested resource.

19 Claims, 3 Drawing Sheets

COBROWSING MACROS

BACKGROUND

Embodiments of the present invention may generally relate to co-browsing sessions. More particularly, embodiments may relate to the use of macros in co-browsing sessions.

A common issue that users may have when visiting web sites is an inability to locate desired content via typical navigation methods (e.g., links). Such a condition could occur for large and/or complex web sites as well as for sites experiencing outages. While users may leverage web site search engines in certain circumstances to address this concern, there remains considerable room for improvement. For example, conventional search engines may rely on the content of the site being indexed. Certain pages and/or resources on a page, however, might not be fully indexed by search engine providers. Moreover, there may be processing overhead and/or costs associated with indexing web content. There may even be certain visitor navigation patterns that are not able to be represented by traditional search engine indexing solutions.

Accordingly, users may call a help desk associated with the web site in order to have a customer service representative (CSR) detail the exact steps involved in reaching a specific page. Such an approach can be time consuming from the perspective of both the user and the CSR. Indeed, the time spent in repeatedly assisting large numbers of customers with locating the same page or resource can be particularly challenging to CSR's, who may be under a considerable amount of pressure to reach certain customer assistance volumes/quotas.

BRIEF SUMMARY

Embodiments may include a computer program product having a computer readable storage medium and computer usable code stored on the computer readable storage medium. If executed by a processor, the computer usable code may cause a first peer device to join a co-browsing session with a second peer device, and receive a plurality of web requests arranged in a particular sequence from a macro. The computer usable code, if executed, may also cause a first peer device to transmit the plurality of web requests in the particular sequence to a server associated with the co-browsing session.

Embodiments may also include a method in which a macro creation request is received via a user interface of a first peer device. The method can also provide for recording a macro in response to the macro creation request, wherein the macro includes a plurality of web requests arranged in a particular sequence, and wherein the particular sequence defines a navigation path to a resource. Additionally, it may be determined that the macro includes a form request. The method may therefore also associate a pause with the form request in the macro, and store the macro to a memory of the first peer device. Moreover, the first peer device may join a co-browsing session with a second peer device, receive a first macro play request via the user interface of the first peer device, and initiate a first instance of the macro in response to the first macro play request. In addition, the method can provide for receiving the plurality of web requests from the macro in the particular sequence and transmitting the plurality of web requests in the particular sequence to a server associated with the co-browsing session. The method can also provide for receiving a final server response to a final web request in the plurality of web requests, and generating a macro completion notification based on the final server response.

Embodiments may also include a computer program product having a computer readable storage medium and computer usable code stored on the computer readable storage medium. If executed by a processor, the computer usable code may cause a first peer device to receive a macro creation request via a user interface of the first peer device, and record a macro in response to the macro creation request, wherein the macro is to include a plurality of web requests arranged in a particular sequence, and wherein the particular sequence is to define a navigation path to a resource. The computer usable code, if executed, may also cause the first peer device to determine that the macro includes a form request, associate a pause with the form request in the macro, and store the macro to a memory of the first peer device. Additionally, the computer usable code, if executed, can cause the first peer device to join a co-browsing session with a second peer device, receive a first macro play request via the user interface of the first peer device, and initiate a first instance of the macro in response to the first macro play request. The computer usable code, if executed, may also cause the first peer device to receive the plurality of web requests from the macro in the particular sequence, transmit the plurality of web requests in the particular sequence to a server associated with the co-browsing session, receive a final server response to a final web request in the plurality of web requests, and generate a macro completion notification based on the final server response.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
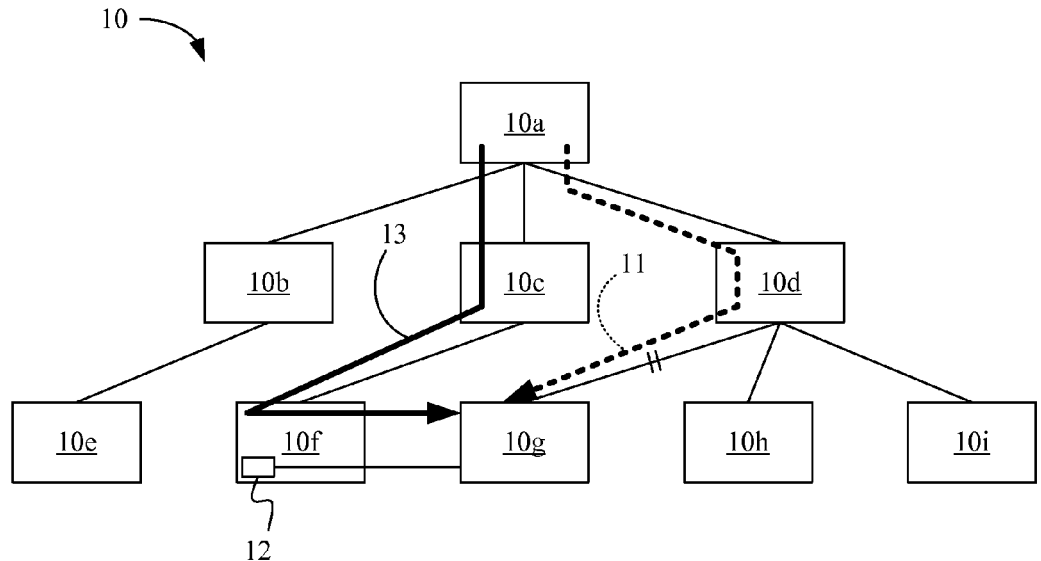
FIG. 1 is a block diagram of an example of a web site map according to an embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a plurality of site map nodes 10 (10a-10i) are shown for a web site, wherein each node 10 may represent a different page and/or resource in the web site. The web site could be, for example, an electronic commerce (e-commerce) site, social networking site, web portal and/or intranet, and so forth, wherein users of the web site may use browsers to navigate to one or more of the nodes 10 of the web site. In general, a target node 10g is normally reachable through multiple navigation paths, in the illustrated example. More particularly, a first navigation path 11 may include the following sequence: node 10a to node 10d to target node 10g. A second navigation path 13, on the other hand, may include the following sequence: node 10a to node 10c to node 10f to target node 10g. In the illustrated example, the first navigation path 11 is broken due to a condition such as an outage, denial of service attack, code defect, etc., that renders the transition from node 10d to the target node 10g inoperable. Accordingly, the only way for a browser to reach the target node 10g, is via the alternative second navigation path 13, in the example shown.

Transitioning from node 10f to node 10g, however, might involve selecting a link 12 that is obscure or otherwise difficult to find. Indeed, the target node 10g and/or the node 10f might not be indexed by one or more search engines so that, unless the user remembers the particular sequence associated with the second navigation path 13, the target node 10g may be effectively unreachable. As will be discussed in greater detail below, techniques described herein may enable a remote customer service representative (CSR) to use a macro to guide the user (e.g., customer) through the second navigation path 13 in a co-browsing session.

Figure 2:
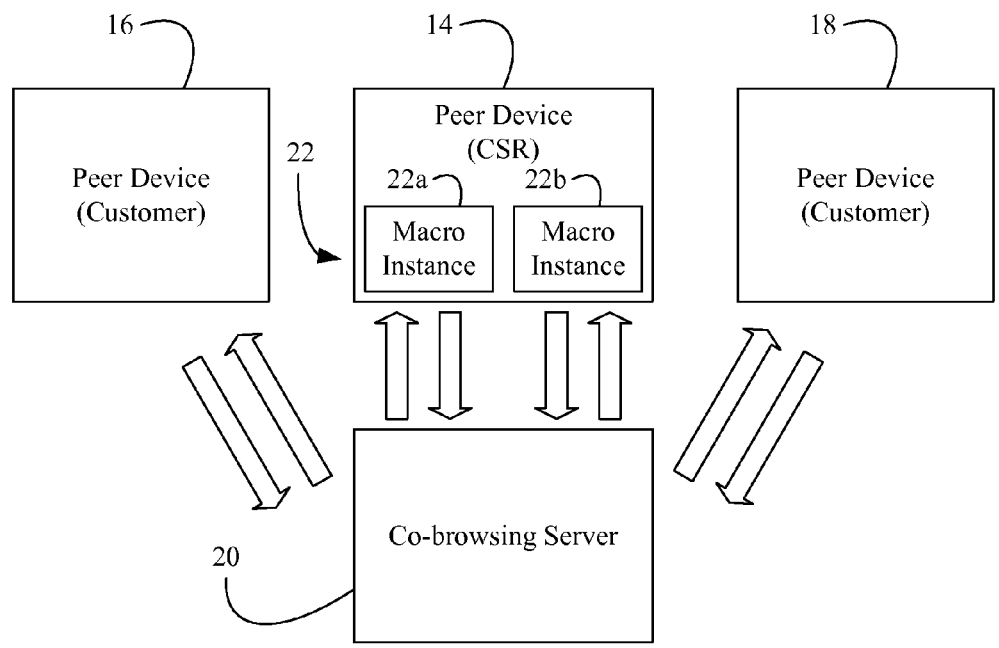
FIG. 2 is a block diagram of an example of a plurality of macro-based co-browsing sessions according to an embodiment.

FIG. 2 shows a scenario in which a first peer device 14 participates in both a first co-browsing session with a second peer device 16, and a second co-browsing session with a third peer device 18, wherein at least a portion of the two co-browsing sessions may occur in parallel. In general, the co-browsing sessions may be managed via a co-browsing server 20, which may receive web requests from devices participating in a given co-browsing session and distribute its responses to those web requests to each peer device participating in the respective co-browsing session. As a result, the peer devices participating in a co-browsing session may be able to experience the same browsing sequences/navigation paths. Thus, if the illustrated first peer device 14 requests a page corresponding to the node 10a (FIG. 1) in the first co-browsing session with the second peer device 16, then the co-browsing server 20 may send that page to both the first peer device 14 and the second peer device 16 in the response to the request. Similarly, if the illustrated first peer device 14 requests the page corresponding to the node 10a (FIG. 1) in the second co-browsing session with the third peer device 18, the co-browsing server 20 may send that page to both the first peer device 14 and the third peer device 18 in response to the request.

In the illustrated example, the first peer device 14, includes a first instance 22a of a macro 22 (22a, 22b) that generates a plurality of web requests in a particular sequence, wherein the web requests may be transmitted in the particular sequence to the co-browsing server 20. In one example, the particular sequence corresponds to the second navigation path 13 (FIG. 1), wherein the first co-browsing session might take place during an outage condition with respect to the first navigation path 11 (FIG. 1). Accordingly, the co-browsing server 20 may deliver the particular sequence of web pages to both the first peer device 14 and the second peer device 16 during the first co-browsing session. Of particular note is that, the first macro instance 22a may prevent the CSR operating the first peer device 14 from having to remember or manually select the correct sequence of web pages via the browser running on the first peer device 14.

Moreover, the initiating the first macro instance 22a may enable the CSR operating the first peer device 14 to assist another customer such as the customer operating the third peer device 18, while the first macro instance 22a is executing. Indeed, the CSR could initiate a second macro instance 22b during the second co-browsing session with the third peer device 18, wherein the second macro instance 22b may be configured to generate the same sequence of web requests as the first macro instance 22a. The CSR may also, of course, initiate a different macro if the customer operating the third peer device 18 is seeking a different page and/or resource on the web site. In either event, the CSR is able to direct multiple customers through repeatable navigation paths in co-browsing sessions at the same time, in the illustrated example. Accordingly, the illustrated solution may be less time consuming from the perspective of both the customer and the CSR, and may enable the CSR to be much more efficient.

Figure 3A:
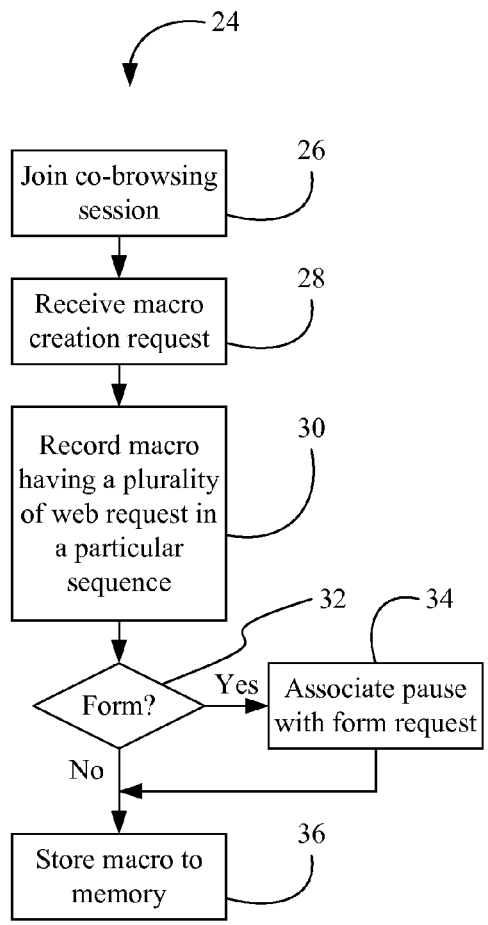
FIG. 3A is a flowchart of an example of a method of creating a macro according to an embodiment.

Turning now to FIG. 3A, a method 24 of creating a macro is shown. The method 24 may be implemented as a browser plug-in or as a stand-alone module on a local peer device such as the first peer device 14 (FIG. 2), already discussed. Illustrated processing block 26 provides for joining a co-browsing session with another peer device. In one example, a CSR operating the local device may be on the phone or in an instant messaging (IM) session with a customer operating the other peer device, wherein the customer requests guidance to a web site page and/or resource and the CSR determines that a macro does not already exist for guiding the customer to the request page and/or resource. Accordingly, joining the co-browsing session may involve, for example, transmitting a session initiation message to a co-browsing server, transmitting an acknowledgement message to the co-browsing server (e.g., for a co-browsing session initiated by the other peer device), and so forth.

A macro creation request may be received at block 28 via a user interface of the local peer device. The user interface may be, for example, a touch screen, keyboard, keypad, microphone, etc., or other suitable device for entering commands and/or requests into the local peer device. Illustrated block 30 records a macro in response to the macro creation request, wherein the macro includes a plurality of web requests arranged in a particular sequence. As already noted, the particular sequence may define a navigation path to the requested resource. A determination may be made at block 32 as to whether the macro includes a form request. In this regard, HTML (hypertext markup language) forms, such as online purchasing forms, applications, etc., may be part of the navigation sequence, wherein entry of information by the customer may be needed. Accordingly, if a form request is detected at block 32, illustrated block 34 provides for associating a pause with the form in the macro. Thus, when the macro is played back (e.g., for another customer), the pause may give the customer the opportunity to enter whatever data is required. Block 34 can also involve associating a pause notification with the pause in the macro, so that the CSR may be alerted as to the need for customer input. The pause notification may be delivered to the CSR via the user interface of the local peer device, text message, or other suitable notification mechanism. The macro may be stored to local memory at block 36. The macro may also be stored to a central repository that is accessible by multiple CSRs.

Figure 3B:
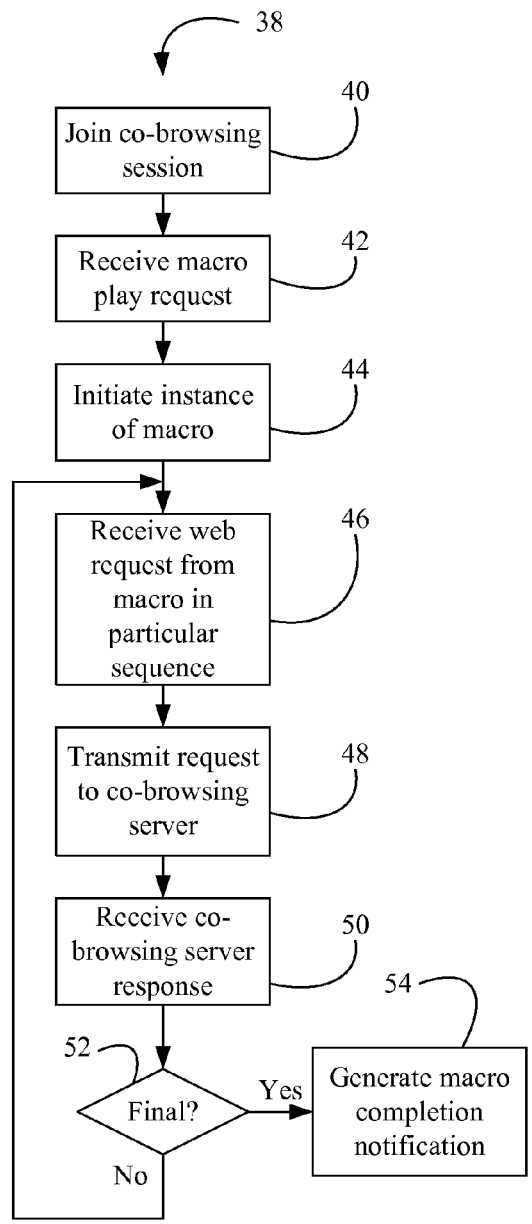
FIG. 3B is a flowchart of an example of a method of using a macro in a co-browsing session according to an embodiment.

FIG. 3B shows a method 38 of using a macro in a co-browsing session. The method 38 may therefore be implemented as a browser plug-in or as a stand-alone module on a local peer device such as the first peer device 14 (FIG. 2), already discussed. Illustrated processing block 40 provides for joining a co-browsing session with another peer device, as also already discussed. A macro play request may be received at block 42, wherein illustrated block 44 provides for initiating a macro instance in response to the macro play request. Additionally, a web request may be received at block 46 from the macro in a particular sequence such as, for example, a sequence corresponding to the second navigation path 13 (FIG. 1), already discussed. The web request may be transmitted to a co-browsing server associated with the co-browsing server at block 48, wherein illustrated block 50 receives a co-browsing server response to the request. The response may be a web page corresponding to a URL (uniform resource locator) contained in the web request.

If it is determined at block 52 that the co-browsing server response is a final response to be received in conjunction with the macro, block 54 may generate a macro completion notification. The macro completion notification may be delivered to the CSR via the user interface of the local peer device, text message, or other suitable notification mechanism. If the co-browsing server response is not the final response to be received in conjunction with the macro, the illustrated process repeats in order to retrieve additional web requests in the particular sequence. Additionally, the illustrated method 38 may be repeated for multiple instances of the same macro or for different macros, so that the CSR can achieve greater efficiency by assisting a plurality of customers in parallel.

Figure 4:
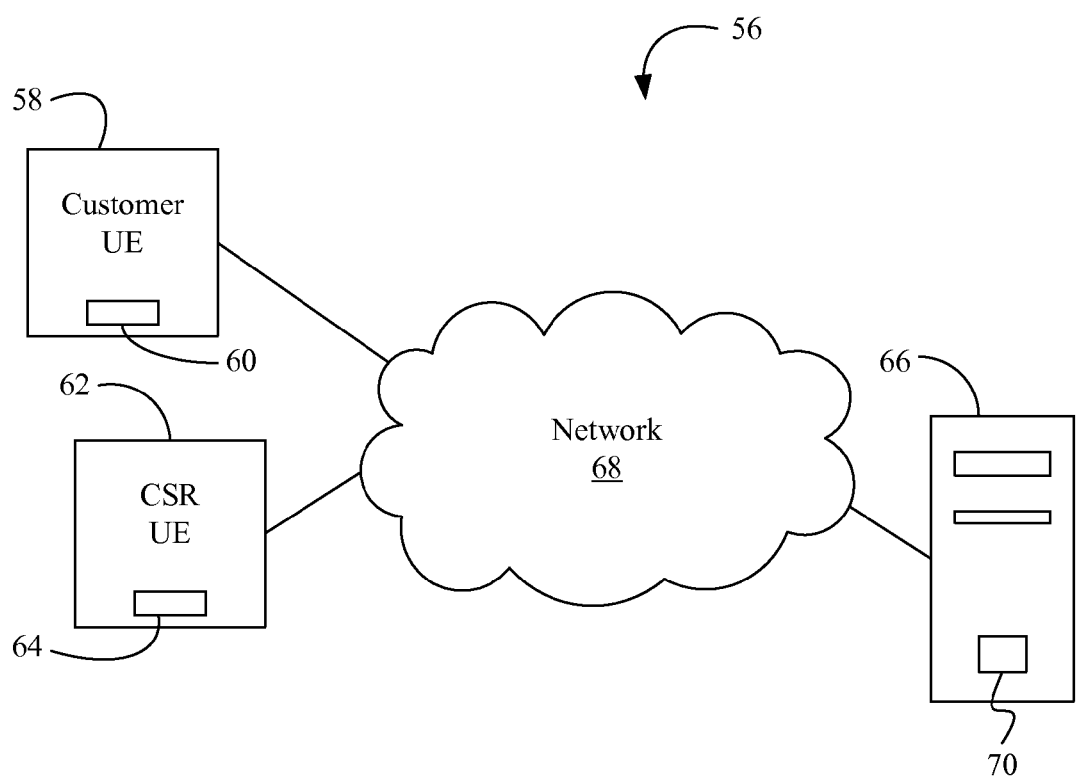
FIG. 4 is a block diagram of an example of a networking architecture according to an embodiment.

FIG. 4 shows a networking architecture 56 in which a customer user equipment (UE) device 58 includes a browser 60 configured to participate in a co-browsing session with a customer service representative (CSR) UE device 62 via a network 68 and a co-browsing server 66. In the illustrated example, the CSR UE device 62 includes a browser 64 configured to receive a macro creation request via a user interface of the CSR UE device 62, record a macro in response to the macro creation request, and store the macro. The browser 64 of the CSR UE device 62 may also be configured to join the co-browsing session with the customer UE device 58, receive a plurality of web requests in a particular sequence from the macro, and transmit the plurality of web requests in the particular sequence to the co-browsing server 66. The network 68 can itself include any suitable combination of servers, access points, routers, base stations, mobile switching centers, public switching telephone network (PSTN) components, etc., to facilitate communication between the UE devices 58, 62 and the server 66. In one example, the server 66 includes logic 70 to transmit responses to the web requests to both of the UE devices 58, 60, so that the UE devices share a common browsing sequence.

Techniques described herein may therefore significantly reduce the amount of time required to conduct repeatable navigation sequences in co-browsing sessions. The CSR can either determine that a requested navigation path is a common usage pattern that is captured in a pre-existing macro (e.g., the macro can help the customer determine the next appropriate action or set of actions), or the CSR can create a new macro on-demand that may be used in the future for other customers. Accordingly, CSR's may be more productive and the customer experience may be enhanced.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method comprising:
   receiving a macro creation request via a user interface of a first peer device;
   recording a macro in response to the macro creation request, wherein the macro includes a plurality of web requests arranged in a particular sequence, and wherein the particular sequence defines a navigation path to a resource;
   determining that the macro includes a form request;
   associating a pause with the form request in the macro;
   storing the macro to a memory of the first peer device;
   joining a co-browsing session with a second peer device;
   receiving a first macro play request via the user interface of the first peer device;
   initiating a first instance of the macro in response to the first macro play request;
   receiving the plurality of web requests from the macro in the particular sequence;
   transmitting the plurality of web requests in the particular sequence to a server associated with the co-browsing session;
   receiving a final server response to a final web request in the plurality of web requests from the server; and
   generating a macro completion notification based on the final server response.

2. The method of claim 1, wherein the navigation path is an alternative to a primary path to the resource.

3. The method of claim 1, wherein the resource is associated with a non-indexed page.

4. The method of claim 1, further including associating a pause notification with the pause in the macro.

5. The method of claim 1, further including:
   receiving a second macro play request via the user interface of the first peer device; and
   initiating a second instance of the macro in response to the second macro play request, wherein at least a portion of the second instance executes in parallel with the first instance.

6. A computer program product comprising:
   a non-transitory computer readable storage medium; and
   computer usable code stored on the computer readable storage medium, wherein, if executed by a processor, the computer usable code causes a first peer device to:
   receive a macro creation request via a user interface of the first peer device;
   record a macro in response to the macro creation request, wherein the macro is to include a plurality of web requests arranged in a particular sequence, and wherein the particular sequence is to define a navigation path to a resource;
   determine that the macro includes a form request;
   associate a pause with the form request in the macro;
   store the macro to a memory of the first peer device;
   join a co-browsing session with a second peer device;
   receive a first macro play request via the user interface of the first peer device;
   initiate a first instance of the macro in response to the first macro play request; receive the plurality of web requests from the macro in the particular sequence;
   transmit the plurality of web requests in the particular sequence to a server associated with the co-browsing session;
   receive a final server response to a final web request in the plurality of web requests; and
   generate a macro completion notification based on the final server response.

7. The computer program product of claim 6, wherein the navigation path is to be an alternative to a primary path to the resource.

8. The computer program product of claim 6, wherein the resource is to be associated with a non-indexed page.

9. The computer program product of claim 6, wherein the computer usable code, if executed, causes the first peer device to associate a pause notification with the pause in the macro.

10. The computer program product of claim 6, wherein the computer usable code, if executed, causes the first peer device to:
    receive a second macro play request via the user interface of the first peer device; and
    initiate a second instance of the macro in response to the second macro play request, wherein at least a portion of the second instance is to execute in parallel with the first instance.

11. A computer program product comprising:
    a non-transitory computer readable storage medium; and
    computer usable code stored on the computer readable storage medium, wherein, if executed by a processor, the computer usable code causes a first peer device to:
    join a co-browsing session with a second peer device;
    receive a plurality of web requests arranged in a particular sequence from a macro;
    transmit the plurality of web requests in the particular sequence to a server associated with the co-browsing session;

receive a macro creation request via a user interface of the first peer device;

record the macro in response to the macro creation request; and store the macro to a memory of the first peer device.

12. The computer program product of claim 11, wherein the particular sequence is to define a navigation path to a requested resource.

13. The computer program product of claim 12, wherein the navigation path is to be an alternative to a primary path to the requested resource.

14. The computer program product of claim 12, wherein the resource is to be associated with a non-indexed page.

15. The computer program product of claim 11, wherein the computer usable code, if executed, causes the first peer device to:

determine that the macro includes a form request; and associate a pause with the form request in the macro.

16. The computer program product of claim 15, wherein the computer usable code, if executed, causes the first peer device to associate a pause notification with the pause in the macro.

17. The computer program product of claim 11, wherein the computer usable code, if executed, causes the first peer device to:

receive a final server response to a final web request in the plurality of web requests; and generate a macro completion notification based on the final server response.

18. The computer program product of claim 11, wherein the computer usable code, if executed, causes the first peer device to:

receive a first macro play request via a user interface of the first peer device; and initiate a first instance of the macro in response to the first macro play request.

19. The computer program product of claim 18, wherein the computer usable code, if executed, causes the first peer device to:

receive a second macro play request via the user interface of the first peer device; and initiate a second instance of the macro in response to the second macro play request, wherein at least a portion of the second instance is to execute in parallel with the first instance.

* * * * *